UNITED STATES PATENT OFFICE.

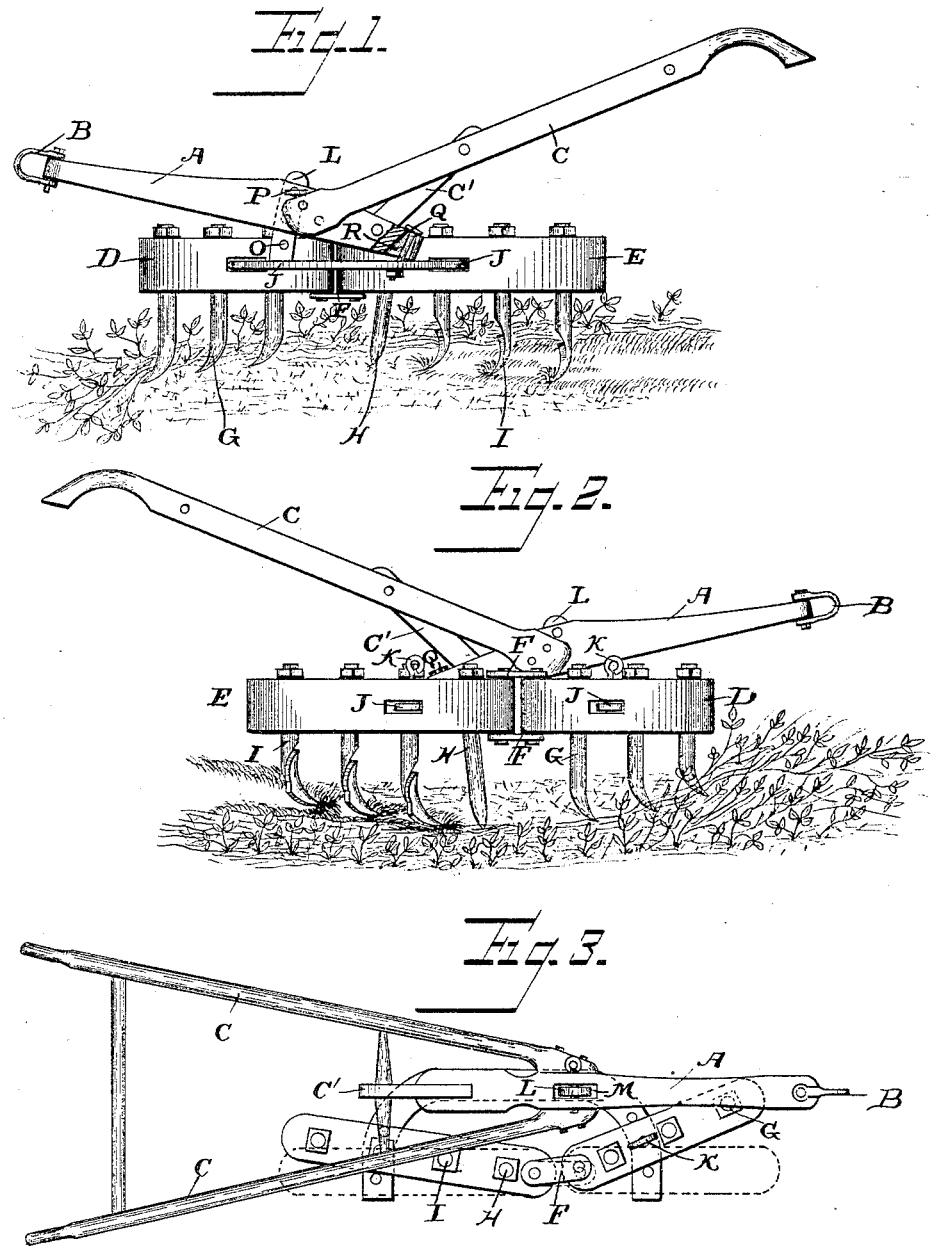

ISAAC D. CARPENTER, OF DIX, ILLINOIS.

STRAWBERRY-CULTIVATOR, &c.

SPECIFICATION forming part of Letters Patent No. 439,474, dated October 28, 1890.

Application filed June 11, 1890. Serial No. 355,074. (No model.)

*To all whom it may concern:*

Be it known that I, ISAAC D. CARPENTER, a citizen of the United States, residing at Dix, in the county of Jefferson and State of Illinois, have invented certain new and useful Improvements in Strawberry-Cultivators and Runner Self-Turners; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention is to facilitate the cultivation of the strawberry-plant in particular, and will be well adapted to the cultivating of any of the plants which are cultivated in rows, and which, like the strawberry, have the habit of producing vines or "runners" that spread in all directions over the spaces between the rows until they interlace and render it troublesome and expensive to cultivate the crop while preserving the vines or runners, as must necessarily be done.

As is well known to those skilled in strawberry culture on a large scale, in starting a new field the plants are first set in rows four feet apart, and the plants set from fourteen to twenty inches apart in the row. It is desired that these first-set plants should increase and multiply until the row is compactly filled in its longitudinal direction first, and then the row should gradually be made to spread laterally or widen out by carefully taking up the runners, which naturally shoot across the spaces between the rows and "set" or take root and form a new plant at each of its joints, and moving them alongside of the rows where they originated, so that they may immediately take new root and increase the width of the rows and narrow the spaces between the rows at pleasure. This method of taking up these runners and moving them from their positions across the spaces between the rows requires repeating as often as every two to three weeks during the whole season that the vines are growing, as this is the only means of quickly producing a full-bearing field of strawberries, and the only means of clearing the spaces between rows, so that they may be cultivated.

My invention enables the work indicated to be done by horse-power instead of by hand, and thus not only save the labor and expense heretofore incurred, but also to expedite the operation and to overcome the difficulties mentioned and accomplish the objects specified.

The invention consists in the construction and combination of parts hereinafter particularly described and claimed, reference being had to the accompanying drawings, forming part hereof, and in which—

Figure 1 is a side elevation looking at the beam or row side of the cultivator. Fig. 2 is a side elevation looking at the harrow or furrow side, and Fig. 3 a plan view of the same.

In the drawings, the letter A designates a beam provided with the clevis B and handles C, whose connection to the beam is strengthened by the upright bar C'. To one side of the beam is located a frame provided with a series of curved teeth with their points set at an angle to the length of the beam with the front or advance tooth located so as to pass under and lift the outer end of the laterally-extending runner, and the tooth back of it will pass under and lift the runner at a point nearer the row, and the third tooth will pass under and lift the portion of the runner still nearer the row, and so on, through the desired number of teeth. Then follows another tooth, preferably straighter than the teeth which precede it, and which tooth may be perfectly straight and located outside the line of plows which follow, so as to turn or move the runners outside of the way of the plows and allow the plows to throw the dirt or soil up against the runners or their roots close to the side of the row. Such are the general features of construction, and they lift and turn the runners parallel with the row and furnish earth or soil to cover and nourish the plants where the runners will take root.

The preferred details of construction are as follows: The frame is composed of two parts D and E, suitably hinged together—say at their meeting or adjacent ends—by plates F, to which the ends will be pivoted or swiveled, if the frame is made of wood; but if the frame is made of iron, which is preferred, then the ends simply lap and hinge with a bolt, the rear section E, preferably, being longer than the front section D. The sections will be of any desired material—say three by four inch oak, or of bar-iron two inches wide by five-eighths of an inch thick—and of any desired length; the front section, say, about one foot six inches and the rear section about two feet long. The front section will carry the curved teeth G, which may be of steel and any desired length, a good length being about twelve inches and the teeth being of a strength sufficient to turn the earth as ordinary cultivator-teeth. These teeth are curved at their lower ends and set with their points at an angle, preferably, of about twenty degrees to the length of the beam A. The curve to the teeth will, if the runner has taken root, lift it up and detach the roots and lay it along side the row without injury to the plant. The rear section E carries the tooth H, which has but little curve or is comparatively straight, and also the plows I. The lower portion of the tooth H is outside the line that will be covered by the furrows of the plows to the rear thereof, and will complete the operation of turning the runners out of the way of the plows which follow. These plows will run comparatively close to the side of the rows and throw up the dirt or soil around the roots of the plants and the turned runners, so as to cover and protect the same.

The front and rear sections of the frame are preferably set at an oblique angle to each other, as shown, so that the runners can be the better lifted and turned, as described, and the soil plowed and the earth thrown, as hereinbefore indicated. The obliquity of the two sections can be varied as circumstances or conditions may require, and for that purpose the two sections are rendered adjustable along or upon a plate J, which is preferably of the elliptical form illustrated, and also connects the frame to the beam as well as supports the beam. The ends of this connecting-plate are perforated, and pins K, passing through the section of the frame if of wood, or over its top if of iron, and entering said perforations, hold the frame to the plate, and by shifting the pin from one perforation to another either one or both the sections D and E may be changed to the angle desired, so as to set the teeth or the plows, or both, at different angles to the length of the rows.

The beam A is connected to the plate J through a standard L, which passes through a slot M, made in the beam, if of wood, or if iron, then the standard L is slotted, and which is provided with a series of perforations O, so that a pin P, passing through the beam, may enter any one of said perforations and thus hold the beam at the adjustment desired or required to raise or lower the draft to regulate the depth thereof. The beam is steadied by a stud or pin Q, rising from the plate J and entering a slot or flaring recess R in the rear of the beam, the slot or recess permitting the necessary movement of the beam to accommodate the adjustment; but if the beam is of iron its rear end is curved downward and drawn out to a bolt, which passes through the plate L loosely, so as to permit the adjustments of the beam and receives a nut on the under side of the plate L.

I have described with particularity and some minuteness the details of construction of the several parts, but do not mean thereby to be understood as restricting myself thereto, as departures may be made therefrom and my invention still used. It will also be understood that the frame may be applied to either side of the beam, so as to make the cultivator work either side of the row, the parts being reversed to what they are shown to be in the accompanying drawings, and only such changes being made as will occur to the skilled mechanic in changing the cultivator to work from one side to the other, and even if duplicated, so as to be on both sides, it would be embraced in my invention.

Having described my invention and set forth its merits, what I claim is—

1. The combined strawberry-cultivator and runner self-turner, comprising the beam and the frame located on one side thereof and provided with cultivator-teeth arranged to pass under the runners in succession from front to rear to lift and turn the runners alongside the rows, and plows to throw earth against the runners, when turned, substantially as and for the purposes set forth.

2. The combined strawberry-cultivator and runner self-turner, comprising the frame provided with cultivator-teeth set so that the forward tooth will pass under and turn the runner toward the row, and the teeth back of said tooth will pass under the runner at points nearer the row and likewise turn the same toward the row while the plows at the rear will throw earth against the inturned runners to protect the same, substantially as and for the purposes set forth.

3. The strawberry-runner self-turner comprising the beam provided with a series of teeth set so that the teeth from front to rear will in succession pass under the runners at points approaching nearer to the row and thus lift and turn the runners from their outer ends by degrees inwardly to bring them alongside the row, substantially as and for the purposes set forth.

4. The combined strawberry-cultivator and runner self-turner, comprising the frame made in adjustable sections, one section being provided with cultivator-teeth and the other with plows, the teeth being arranged to pass under the runners in succession from front to rear to gradually move the runners from their outer ends inwardly to bring their length along the rows, and the plows arranged to throw the earth against the runners when turned alongside the row, substantially as and for the purposes set forth.

5. The combined strawberry-cultivator and runner self-turner, comprising the frame made in adjustable sections, the front section provided with a series of curved teeth arranged to pass under the runners in succession to gradually move them from their outer ends inwardly to bring them lengthwise of the row, and the rear section provided with plows to throw earth against the runners when turned alongside the row, and with a tooth out of line with the plows and between them and the teeth to the front section, substantially as and for the purposes set forth.

6. The combined strawberry-cultivator and runner self-turner, comprising the frame made in sections hinged together, the plate to which said sections are adjustably connected to change their angle to the line of draft, the curved teeth secured to the front section to successively pass under the runners at points nearer the inner ends, the tooth secured to the rear section and the plows secured to the same section back of said tooth, substantially as and for the purposes set forth.

In testimony whereof I affix my signature in presence of two witnesses.

ISAAC D. CARPENTER.

Witnesses:
CHARLES H. PATTON,
JACKSON N. BOND.